United States Patent Office 3,562,175
Patented Feb. 9, 1971

3,562,175
GADOLINIUM OXIDE PARTICLE GROWTH
IN LITHIUM OXIDE FLUX
Robert L. Hickok, Richmond Heights, Ohio, assignor to General Electric Company, a corporation of New York
No Drawing. Filed Sept. 11, 1968, Ser. No. 759,208
Int. Cl. C01f 17/00; C09k 1/10
U.S. Cl. 252—301.4                               11 Claims

ABSTRACT OF THE DISCLOSURE

Crystalline particles of gadolinium oxide, such as the phosphor activated with europium can be grown into a size suitable for color television applications and other uses by firing in a flux of lithium oxide at a temperature below about 1200° C. Yttrium oxide can be partially substituted for up to about 50 molar percent of the gadolinium oxide. The initial oxide, such as the phosphor prepared by firing mixed gadolinium and europium oxalates precipitated from the nitrates and being best described as porous aggregates of perhaps 4 microns in diameter in which the individual or primary particles are about 1 micron or less in diameter, can be converted to a mixture of individual or primary particles and highly compact polycrystalline particles of from 4 to 10 microns.

BACKGROUND OF THE INVENTION

The present invention relates to processes for the growing of phosphor crystals. More particularly, it relates to such processes for growing crystals of $Gd_2O_3$ and phosphors based on $Gd_2O_3$.

Europium-activated gadolinium oxide has long been known to be an efficient red light emitting phosphor when excited by cathode rays, X-rays or ultraviolet light. This is true only of the low temperature crystalline modification, the C or cubic phase of gadolinium oxide. The B or monoclinic phase which is obtained by heating the cubic phase to temperatures near 1200° C. is only poorly luminescent under similar excitation.

A serious problem involved in producing $Gd_2O_3$:Eu phosphor suitable for use in cathode ray tubes as in color television is that of obtaining the low temperature form with a preferred extent of particle coarseness. As it is usually prepared by thermal decomposition of the oxalate, the oxide, $Gd_2O_3$ (or $Gd_2O_3$:Eu phosphor), is obtained as a fine powder of small aggregates of very fine particles. Due to the refractory nature of the oxide, it is not possible to cause significant growth of particles by prolonged firing at temperatures below 1200° C. Particle growth can occur at higher temperatures given sufficient time, such as 1250° C. for 24 or more hours or higher for shorter times but a phase transition to the B form occurs. Larger particles of the B phase only very slowly revert to the desired C phase when annealed, and in doing so they fracture into smaller particles.

Furthermore, none of the commonly used fluxes or mineralizers have been found suitable to effect growth of the C form of $Gd_2O_3$ at a temperature below the transition point, and some of these also adversely affect the luminescent efficiency of the phosphor. Common fluxes which have been found unsuitable for this purpose include chlorides and fluorides of some of the alkali and alkaline earth elements, boric oxide, lithium borate, alkali nitrates plus alkali hydroxides, and water vapor.

SUMMARY OF THE INVENTION

Thus, it is an object of the present invention to provide a method for growing crystals of cubic $Gd_2O_3$:Eu to particle sizes suitable or preferential for cathode ray tube applications. A further object is to do so without impairing the luminescent characteristics of the phosphor. Another object is to grow crystals of cubic $Gd_2O_3$ with or without light-producing activators.

Briefly stated, the present invention in one of its embodiments provides a process of growing $(Gd_{1-x}Y_x)_2O_3$ particles ($x$ is less than 0.50) from small, highly aggregated forms to larger single crystal and polycrystalline particles by heating the oxide in a flux of $Li_2O$ for a sufficient time at a temperature under about 1200° C., such as from 1000 to 1200° C. for 1 to 4 hours. The reacted mixture is then washed, such as with hot water, to remove the lithium.

The invention is particularly useful in treating crystals of $Gd_2O_3$:Eu of about 1 micron average diameter with substantial amounts of aggregation as particles of 3 to 4 microns average diameter to convert them to larger particle sizes. In such cases, the resultant phosphor preferably has an average particle diameter in the range of about 4 to 10 microns with little if any aggregation, but it can be made with average particle diameters of 20 microns or more. The aggregation of the resulting phosphor is generally in the form of few compact polycrystalline particles rather than the larger proportions of porous aggregates of the untreated phosphor as initially formed.

Preferably molar ratios of flux to phosphor are in the range of about 1:1 to 1:30, and 1:3 seems most desirable. Suitable lithium compounds which decompose on heating to the oxide may be used, such as $Li_2CO_3$.

The europium concentration in the phosphor may suitably be in the range of 1 to 10 atom percent of the total rare earth content. For color television application, it would preferably be in the range of 1 to 6 atom percent of the total rare earth content.

DESCRIPTION OF THE PREFERRED EMBODIMENTS

Although the alkali oxides could be expected to be unlikely candidates for fluxing $Gd_2O_3$ and $Gd_2O_3$:Eu phosphors to achieve particle growth because of known reactions with $Gd_2O_3$ to form compounds such as sodium gadolinate, applicant has found that $Li_2O$ does not form a gadolinate which is stable at low temperatures such as below about 1000° C., and it is not detrimental to the luminescent characteristics of the phosphor when used properly as a flux.

Experiments performed with firing $Gd_2O_3$:Eu phosphors of the type described in $Li_2O$ fluxes have been made at temperatures including about 1100° C. with flux to phosphor molar ratios of 1:30, 1:10, 1:3 and 1:1. After washing with hot water, it was determined by flame photometry which has a lower limit of detection of about 0.01 weight percent, that relatively large amounts of lithium were retained in the samples formulated with a 1:1 mole ratio of flux to phosphor. At the lower ratios, practically no retention of lithium has been found. Thus, it can be expected that processes with more than one mole $Li_2O$ to each mole of phosphor would leave an undesirable amount of $Li_2O$ in the product. Less than one mole $Li_2O$ for 30 moles of phosphor does not give satisfactory crystal growth.

The same type of crystal growth has been obtained with $(Gd_{0.85}Y_{0.15})_2O_3$:Eu without harming the brightness by use of $Li_2O$ flux. With over 50 molar percent $Y_2O_3$ substituted for $Gd_2O_3$, the color of the resulting phosphor becomes too orange for color television use, and with pure $Y_2O_3$:Eu the crystal growth does not occur.

Particle growth from single crystals of an average diameter of about 1 micron with much aggregation as particles of 3 to 4 microns to desirable average individual particle sizes in the range of from 4 to 10 microns has been obtained without contamination of the phosphor with $Li_2O$ and without harming luminescent characteristics. Particle growth obtained is not due to any increase in the degree of aggregation. Microscopic observation confirms that individual particles, probably single crystals, have grown and are quite regular in shape and have clear, smooth surfaces.

The preferred procedure including steps of the present invention for producing $Gd_2O_3$:Eu phosphors suitable for cathode ray tube application involves the following steps:

(1) A solid solution of gadolinium and europium oxalates is precipitated from aqueous solution of the oxides and nitric acid by addition of at least stoichiometric amounts of oxalic acid. The europium concentration may be in the range of 1 to 10 atom percent of the total rare earth content.

(2) The rare earth oxalate is fired at a temperature sufficient to decompose the oxalate to yield the oxide. A temperature of 900 to 1000° C. is normal. The oxide obtained at this point is composed of very small crystals aggregated in porous particles of 3 to 4 microns average diameter. This is a poor television phosphor, largely because of its small particle size.

(3) The oxide obtained in step 2, $Gd_2O_3$:Eu, is blended, wet or dry, with the appropriate amount of $Li_2CO_3$. A mole ratio of 1 mole $Li_2CO_3$ to 3 moles $Gd_2O_3$:Eu has been found to give the desired fluxing action. On a weight basis this is 70 grams $Li_2CO_3$ per kilogram of $Gd_2O_3$:Eu. Blending must be thorough and requires a mechanical mixer capable of violent agitation of the powders. Wet mixing using methanol has been found suitable. Alternatively, the lithium-containing compound could be added to the oxalates before they are fired for conversion to the oxide phosphor.

(4) The firing mixture obtained is loaded into dishes loosely covered and placed in a furnace. The furnace temperature is nominally 1100° C. and the atmosphere is air. Depending on the size of the sample and the amount of growth desired, the firing time may be varied from 1 hour up with a time in the range from 2 to 4 hours normally used.

(5) After the fired phosphor has cooled, it is crushed and the $Li_2O$ flux thoroughly washed out with water. The phosphor is then ready for use, with average particle diameters of about 8 microns.

Samples made as described above having a composition of $0.95Gd_2O_3:0.05Eu_2O_3$ gave brightness measurements approximately 180% that of a commercial yttrium vanadate phosphor used in color television. The color of emitted light was judged to be satisfactory for such applications, well within the range expected from phosphor of this composition, and gave satisfactory measured color coordinates of $x=0.654$ and $y=0.347$ in the ICI system (International Commission on Illumination).

Specific data is presented in Table I below for phosphor samples with varying amounts of flux produced according to the above description. Although single firing between 1000 and 1200° C. is suitable, and a temperature range of 1100 to 1500° C. is preferred, firing of the mixtures was done generally with a first fire at 900° C. for 2 hours, then the material was reblended, and it was subsequently fired another 2 to 4 hours at temperatures in the range of 1100–1200° C. Firing of identically prepared samples was done in both wet and dry air and no significant differences due to the water vapor were observed. The table also presents average brightness and coulter counter particle sizes for the material produced with the different mole ratios of flux to phosphor and containing 3.5 mole percent Eu.

TABLE I.—FLUXING RESULTS

| Sample: | Mole ratio $Li_2O_3$ $Gd_2O_3$:Eu | Batch, wt. percent $Li_2CO_3$ | Brightness, percent of $YVO_4$:Eu | Particle size, Microns |
|---|---|---|---|---|
| 1 | 0 | 0 | 169 | 3.9 |
| 2 | 0.1 | 0.69 | 179 | 5.9 |
| 3 | 0.3 | 2.1 | 177 | 7.4 |
| 4 | 1.0 | 6.9 | 183 | 8.2 |
| 5 | 3.0 | 21 | 100 | 11.7 |

The foregoing is a description of illustrative embodiments of the invention, and it is applicant's intention in the appended claims to cover all forms which fall within the scope of the invention.

What I claim as new and desire to secure by Letters Patent of the United States is:

1. A method for growing crystals of cubic gadolinium oxide comprising the steps of:
   preparing a mixture of crystals of $(Gd_{1-x}Y_x)_2O_3$ (wherein $x$ is less than 0.50) with a flux of a lithium-containing compound which decomposes to $Li_2O$ on heating, with molar ratios of flux to said crystals being about in the range of from 1:30 to 1:1,
   heating said mixture to an elevated temperature between 1000° C. and 1200° C. for a time of at least one hour and sufficient to beneficially increase the size of the crystals, and
   crushing and washing with water the mixture which has been heated to remove residual lithium.

2. The method of claim 1 wherein the gadolinium oxide crystals grown are phosphors activated with europium.

3. The method of claim 2 wherein said crystals have been prepared by a process comprising the following steps:
   precipitating gadolinium and europium oxalates from an aqueous solution of the nitrates, and
   heating the oxalates to decompose them to the oxide phosphor.

4. The method according to claim 2 in which the europium concentration in said phosphor is about in the range of 1 to 10 atom percent of the total rare earth content.

5. A method according to claim 2 in which the europium concentration in said phosphor is about in the range of 1 to 6 atom percent of the total rare earth content.

6. A method according to claim 1 in which said crystals are grown from an average size of not more than about 1 micron, with substantial quantities of aggregated particles of a size of not more than about 4 microns to produce suitable phosphors for cathode ray tube applications having average particle diameters larger than about 4 microns.

7. A method according to claim 6 in which the resultant phosphor particles have an average particle size in the range of about 4 to 20 microns.

8. A method according to claim 1 in which the heating is done at a temperature in the range of about 1000–1200° C. for a time in the range of about 1 to 4 hours.

9. A method according to claim 8 wherein the heating is done at a temperature of about 1100° C. for a time in the range of about 2 to 4 hours.

10. A method according to claim 1 in which a molar ratio of about 1 mole $Li_2O$ to 3 moles $Gd_2O_3$:Eu is used in the mixture.

11. A method according to claim 1 in which the lithium compound is $Li_2CO_3$.

References Cited

UNITED STATES PATENTS

| 3,301,791 | 1/1967 | Brixner | 252—301.4 |
| 3,457,184 | 7/1969 | Kobayashi et al. | 252—301.4 |
| 3,458,451 | 7/1969 | Kobayashi et al. | 252—301.4 |

TOBIAS E. LEVOW, Primary Examiner

R. D. EDMONDS, Assistant Examiner

U.S. Cl. X.R.

23—20, 305